(12) United States Patent
Lovett et al.

(10) Patent No.: US 7,478,522 B1
(45) Date of Patent: Jan. 20, 2009

(54) RECIPROCATING KNIFE CUTTER SYSTEM

(75) Inventors: Benjamin Max Lovett, Colona, IL (US); Bruce Alan Coers, Hillsdale, IL (US); Sheldon Joseph Grywacheski, Eldridge, IA (US); Ryan Scott Heriyn, Port Byron, IL (US); Corwin Marcus Raymond Puryk, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/836,463

(22) Filed: Aug. 9, 2007

(51) Int. Cl.
*A01D 34/13* (2006.01)
(52) U.S. Cl. ................................................. 56/296
(58) Field of Classification Search .................. 56/296, 56/291, 305, 123, 298, 257, 304
See application file for complete search history.

(56) References Cited

U.S. PATENT DOCUMENTS

| | | | | |
|---|---|---|---|---|
| 1,644,962 A * | 10/1927 | Swickard | ..................... | 56/297 |
| 2,808,696 A * | 10/1957 | Hall | ............................ | 56/296 |
| 3,114,230 A * | 12/1963 | Blaauw | ........................ | 56/297 |
| 3,577,716 A * | 5/1971 | McCarty et al. | ............... | 56/259 |
| 4,198,803 A * | 4/1980 | Quick et al. | .................. | 56/296 |
| 4,236,370 A * | 12/1980 | Shaver | ........................ | 56/297 |
| 4,246,742 A * | 1/1981 | Clark et al. | .................... | 56/259 |
| 4,267,689 A * | 5/1981 | Schneider et al. | ............... | 56/53 |
| 4,387,554 A * | 6/1983 | Bedogni | ...................... | 56/296 |
| 4,660,361 A * | 4/1987 | Remillard et al. | ............. | 56/297 |
| 4,854,114 A * | 8/1989 | Speck | ......................... | 56/296 |
| 6,062,012 A * | 5/2000 | Suarez et al. | ................. | 56/257 |
| 6,708,476 B1 * | 3/2004 | Blakeslee et al. | ............. | 56/296 |
| 6,962,040 B2 * | 11/2005 | Talbot | ........................ | 56/297 |
| 7,313,903 B2 * | 1/2008 | Schumacher et al. | .......... | 56/304 |
| 2004/0216440 A1 * | 11/2004 | Talbot | ........................ | 56/296 |
| 2005/0028505 A1 * | 2/2005 | Schumacher | ................. | 56/296 |
| 2008/0006016 A1 * | 1/2008 | Snider et al. | .................. | 56/297 |

FOREIGN PATENT DOCUMENTS

EP   1125490 A1 *   8/2001

* cited by examiner

*Primary Examiner*—Árpád Fábián-Kovács

(57) ABSTRACT

A reciprocating knife cutter system for an agricultural cutting platform has reciprocating knife cutters having cutter bars with adjacent ends that are coupled together by a coupler that maintains the adjacent ends of the cutter bars in a predetermined relative position.

6 Claims, 4 Drawing Sheets

RECIPROCATING KNIFE CUTTER SYSTEM

FIELD OF THE INVENTION

The invention relates to reciprocating knife cutters for agricultural harvesters. More particularly, it relates to methods for permitting constrained relative movement between adjacent cutters and their reciprocating knives.

BACKGROUND OF THE INVENTION

Cutting platforms using conveyor belts (also known as "Draper platforms" or "Drapers") are typically used to harvest non-row crops such as wheat. They typically use reciprocating knife cutters to cut the crop material and separate it from the ground. In the most common configuration, these reciprocating knife cutters include a plurality of individual knives that are mounted on a reciprocating bar that is supported in another bar called a cutter bar. The cutter bar is fixed to the frame and the reciprocating bar with its knives are reciprocated to cut the crop material.

In one arrangement (shown in U.S. patent application Ser. No. 11/366,035, filed Mar. 2, 2006 and assigned to Deere & Company, the assignee of the present invention) two reciprocating knife cutters are mounted to the front of the cutting platform and are driven by a common drive located at the front and center of the cutting platform. The description does state that the drive may be located elsewhere.

It would be preferable to couple the ends of the cutter bars together to permit some relative motion while constraining other relative motion between the ends so the cutter bars do not bind or wear excessively.

It is an object of this invention to provide a reciprocating knife cutter system that provides this constrained relative movement.

SUMMARY OF THE INVENTION

In accordance with a first aspect of the invention, a reciprocating knife cutter system for an agricultural cutting platform is provided, including a first reciprocating knife cutter further comprising a first cutter bar and a first reciprocating bar, the first reciprocating bar having a first plurality of knives fixed thereto, a driven end and a free end; a second reciprocating knife cutter further comprising a second cutter bar and a second reciprocating bar, the second reciprocating bar having a first plurality of knives fixed thereto, a driven end and a free end wherein the first reciprocating bar overlaps the second reciprocating bar; and a coupler configured to couple the free end of the first cutter bar to the free end of the second cutter bar, wherein the coupler is configured to hold the two free ends of the cutter bar coaxial in the vicinity of the coupler and to limit relative movement of one free end with respect to the other free end to movement along a common shared axis.

In accordance with a second aspect of the invention, an agricultural cutting platform includes a main frame having at least one section; a plurality of arms that are coupled at their rear ends to the mainframe and have forwardly extending front ends; and a reciprocating knife cutter system for an agricultural cutting platform, the system comprising: a first reciprocating knife cutter further comprising a first cutter bar and a first reciprocating bar, wherein the first cutter bar is coupled to the front ends of the plurality of arms on the left side of the cutting platform, and further wherein the first reciprocating bar has a driven end, a first free end, and a first plurality of knives fixed to the first reciprocating bar; a second reciprocating knife cutter further comprising a second cutter bar and a second reciprocating bar, wherein the second cutter bar is coupled to the front ends of the plurality of arms on the right side of the cutting platform, and further wherein the first reciprocating bar has a driven end, a second free end adjacent the first free end, and a second plurality of knives fixed to the first reciprocating bar, wherein the first reciprocating bar overlaps the second reciprocating bar; and a coupler configured to couple the free end of the first cutter bar to the free end of the second cutter bar, wherein the coupler is configured to hold the two free ends of the cutter bar coaxial in the vicinity of the coupler and to limit relative movement of one free end with respect to the other free end to movement along a common shared axis.

The coupler may be pivotally coupled to the cutting platform at a point behind the cutter bars to permit the free ends of the two cutter bars to translate up and down with respect to the cutting platform while preventing the cutter bar ends from translating in a fore-and-aft direction with respect to the cutting platform. The coupler may include first and second members removably fixed to the first and second cutter bars, respectively, and a support member coupled to and between the first and second members to constrain their relative movement in a lateral direction. The first and second members define apertures may extend laterally and may be slidingly supported on the support member, and the support member may extend laterally and may be received in the apertures of the first and second members.

DESCRIPTION OF THE PREFERRED EMBODIMENT

Figure 1:
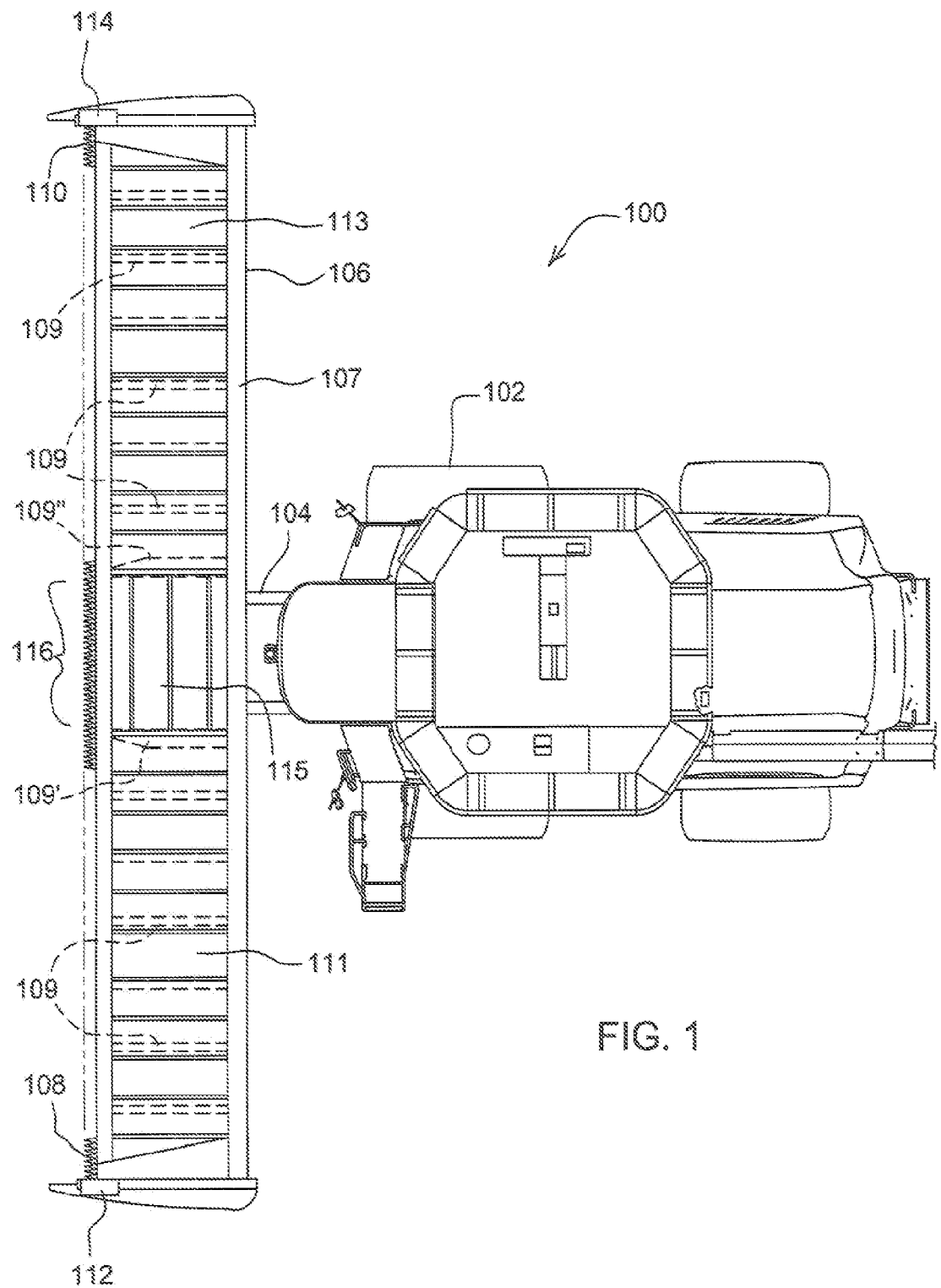
FIG. 1 is a plain view of a cutting platform in accordance with the present invention showing the side belt conveyors, central belt conveyor and reciprocating knife cutter system in accordance with the present invention.

Referring to FIG. 1, an agricultural harvester 100 is shown, including a harvester vehicle 102 from which a feederhouse 104 extends. A cutting platform 106 is mounted on the front of the combine header. The cutting platform 106 has a main frame 107 that is supported on the feederhouse. This main frame may be constructed as a single member, as shown here, or it may be constructed as two or more sections that are pivotally coupled together, as shown in U.S. patent application Ser. No. 11/366,035 ("the 035 application"), which is incorporated herein by reference for all that it teaches.

Cutting platform 106 further comprises a plurality of forwardly extending float arms 109 (in this embodiment about 15) that are pivotally coupled to and extend generally forward from the main frame. Their construction and coupling is shown in the 035 application.

Cutting platform 106 further comprises two reciprocating knife cutters 108, 110 that extend laterally and are flexibly mounted to the front ends of the float arms 109 to extend across substantially the entire width of the mainframe.

Cutting platform 106 further comprises left and right side endless conveyor belts 111, 113 that are supported on the float arms and to be driven inwardly by a motor or motors (not shown) thereby conveying cut crop matter toward the center of the main frame.

Cutting platform 106 further comprises an endless center conveyor belt 115 that is disposed between the belts 111, 113 to carry cut plant matter received from belts 111, 113 backward toward an aperture on the rear wall of the main frame 107. From there, feeder house 104 carries the cut crop material back into the harvester vehicle 102 for further processing.

Left reciprocating knife cutter 108 is coupled to and driven by a linkage 112 that is disposed on the left end of the cutting platform 106. Right reciprocating knife cutter 110 is coupled to and driven by a linkage 114 that is disposed on the right end of the cutting platform 106. The linkages, in turn, are driven by a conventional back shaft drive arrangement that couples the linkages to the engine of the harvester vehicle.

The two reciprocating knives meet at the middle 116 of the platform 106 where they overlap each other to drive overlapping knife sections to insure that all the crop material is cut.

Figure 2:
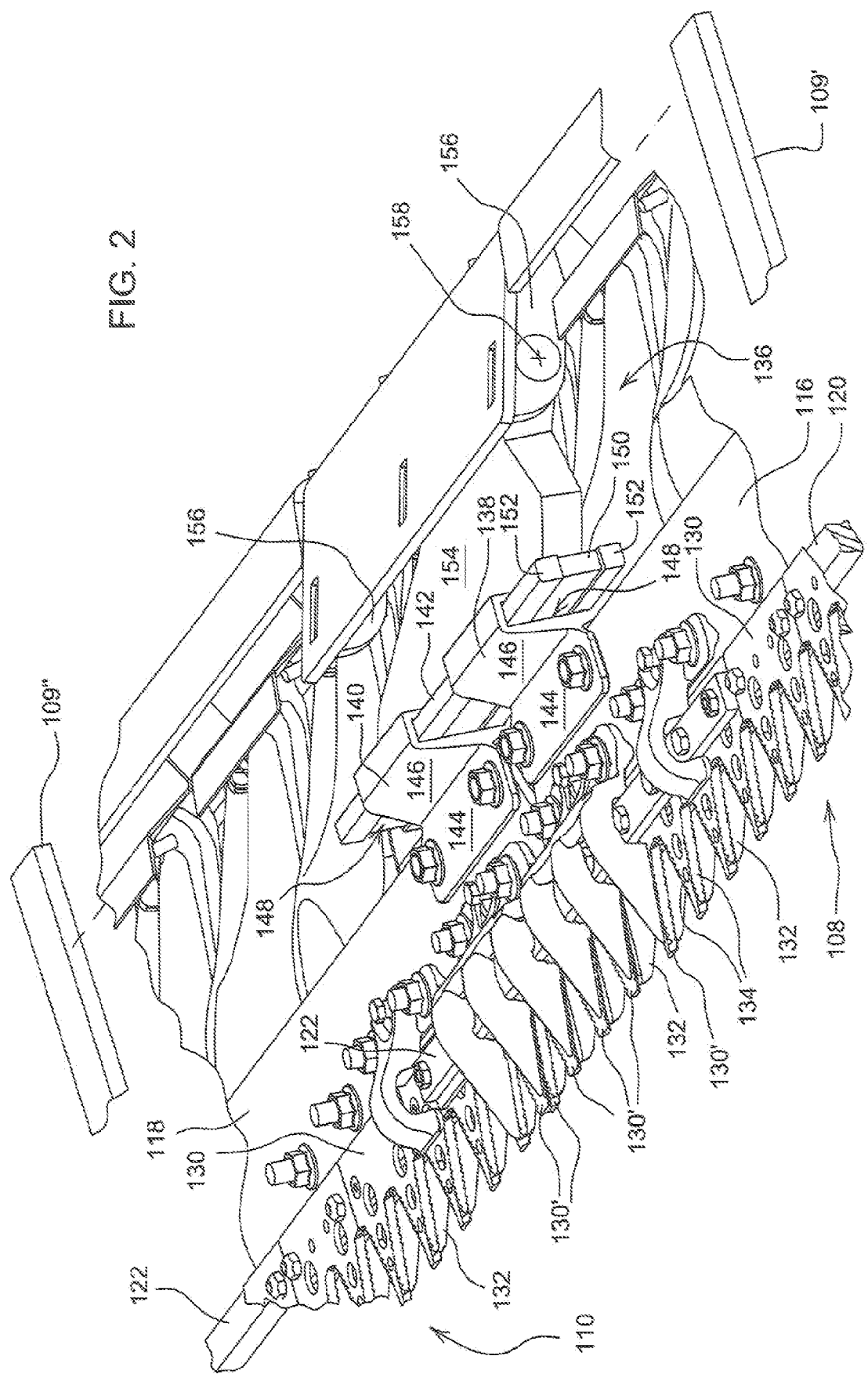
FIG. 2 is a perspective view of a central portion of the cutting platform with the belt conveyors removed and showing the adjacent ends of the cutter bars and the coupler that joins the adjacent ends of the cutter bar together.
Figure 3:
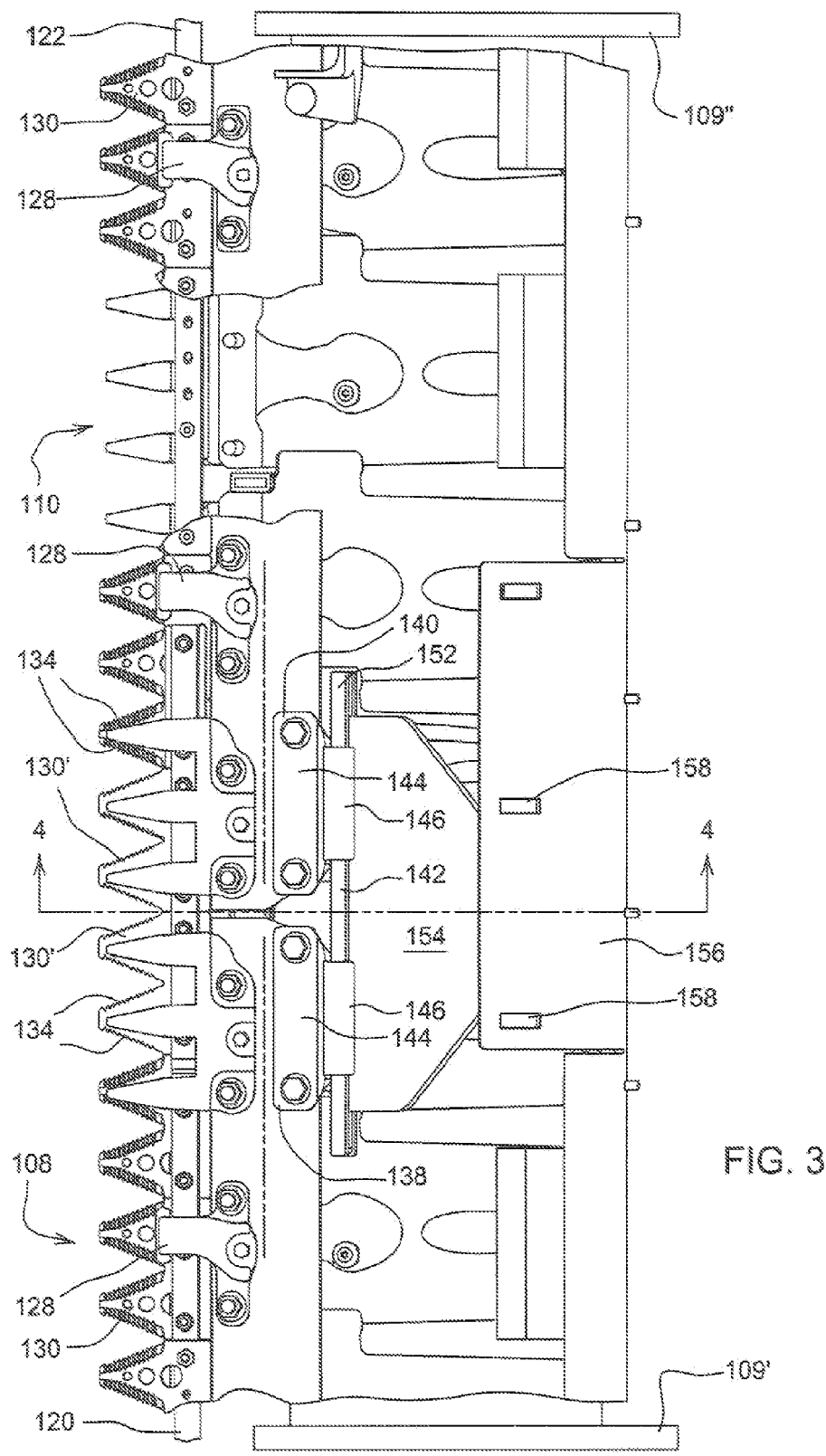
FIG. 3 is a fragmentary plan view of the center portion of the cutting platform with the frame of the platform, belts, and some of the knife sections removed to better illustrate the reciprocating cutting knives.

Referring to FIGS. 2 and 3, reciprocating knife cutters 108, 110 comprise cutter bars 116, 118, respectively, that are disposed in an adjacent and near-abutting relation in the middle of the cutting platform 106.

Reciprocating knife cutters 108, 110 further comprise reciprocating bars 120, 122 that extend substantially the entire width of the cutting platform 106 and are reciprocatingly driven by drives 112, 114.

Reciprocating knife cutters 108, 110 further comprise upper retainers 128 that are removably fastened with threaded fasteners to the top surfaces of cutter bars 116, 118. Retainers 128 are provided in spaced apart relation across substantially the entire length of the reciprocating knife cutters 108, 110.

Reciprocating knife cutters 108, 110 further comprise knife sections 130 that are bolted to reciprocating bars and extend forward to engage the plants to be harvested. Reciprocating knife cutters 108, 110, further comprise fingers 132 that are fixed to and extend forward from cutter bars 116, 118 to engage with the cutting edges 134 of knife sections 130 when they reciprocate, and to shear plant matter therebetween.

Upper retainers 128 abut the knife sections and press the knife sections against the fingers to provide the plant shearing action therebetween. Most of the fingers 132 are attached to the lower surface of the cutter bars, and cut against the knife sections that lay on top of them as the knife sections are reciprocated by reciprocating bars 120, 122.

These fingers extend across substantially the entire width of the reciprocating knives 108, 110.

Figure 4:
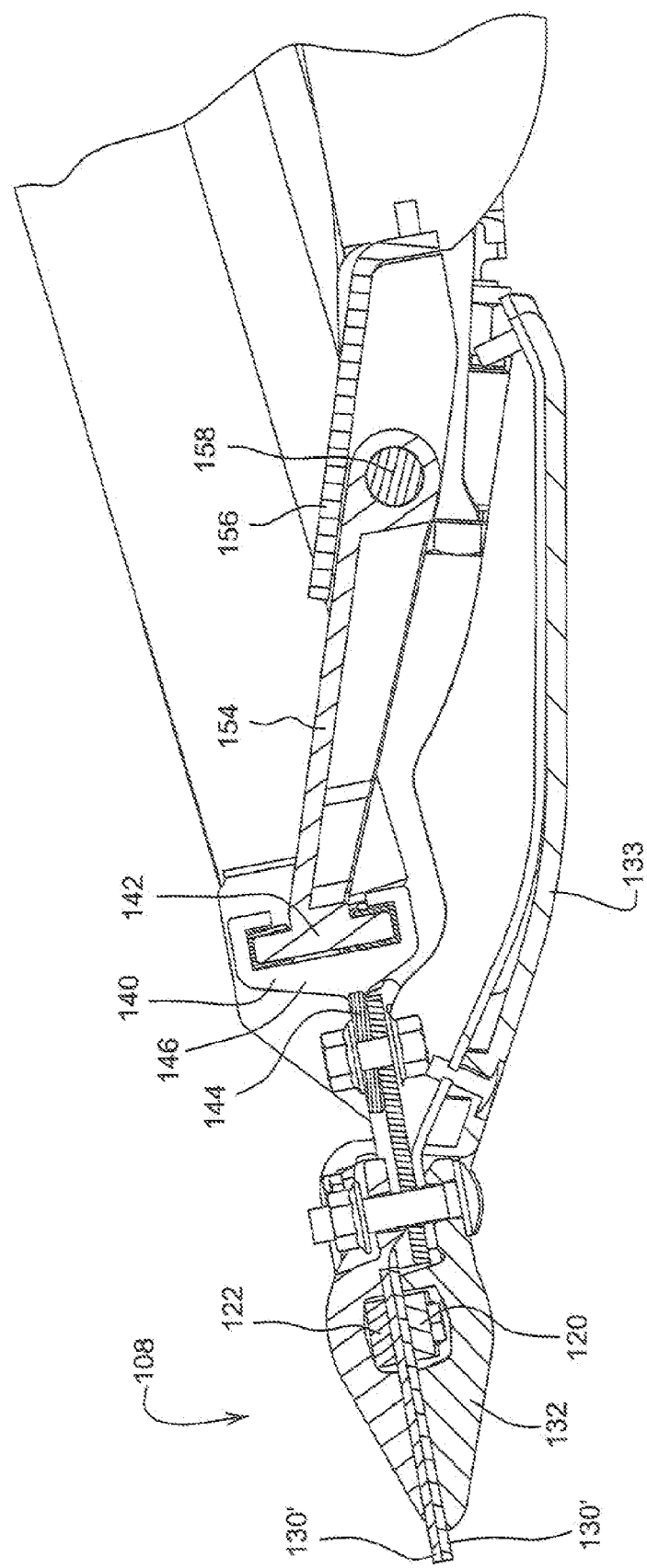
FIG. 4 is a cross-sectional view taken at section line 44 in FIG. 3 showing the overlapping of the knife sections and the first and second receprocating bars.

The reciprocating knife cutters 108, 110 are configured such that the reciprocating bars 120, 122 overlap each other in the center of the cutting platform 106. This is best shown in FIG. 4. A plurality of knife sections 130 mounted at the adjacent ends of reciprocating bars 120, 122 (identified as sections 130') are removably fixed to these overlapping portions of reciprocating bars 120, 122 with bolts or screws such that at least one knife of knife section 130' that is bolted to reciprocating bar 120 overlaps another knife of knife section 130' that is bolted to reciprocating bar 122 during at least some portion of the reciprocating cutting cycle of the two reciprocating bars 120, 122. This overlap insures that no portion of the ground remains uncut.

As noted above, the cutter bars 118, 120 are mounted to and supported on the front ends of float arms 109, and each of float arms 109 is pivotally coupled to cutting platform main frame 107 such that the front end of each float arm 109 can pivot up and down independently of the other float arms.

As the harvester is driven over the ground, skid plates 133 (FIG. 4) that attached to the bottom of the cutter bar across substantially its entire width are pushed upward by the ground as the ground contours change. These upward ground forces are communicated to the cutter bar and to the float arms, causing the cutter bar to deflect upward in varying amounts across its width as the float arms rise and fall, pivoting upward and downward with respect to the main frame 107.

A coupler 136 is provided to couple the ends of cutter bars 116, 118 together and insure that the reciprocating knife cutters 108, 110 remain in the preferred relative alignment at their tips even as the float arms pivot up and down. This coupler 136 constrains the relative movement of the free ends of the cutter bars 116, 118 to reduce or eliminate the wear and breakage that might otherwise occur at the point where the ends of reciprocating bars 120, 122 overlap.

Coupler 136 controls the movement of the ends of cutters bars 116, 118 such that the longitudinal axes of reciprocating bars 120, 122 in the vicinity of the coupler are coaxial and such that the cutter bars 116, 118 in the region of coupler 136 are coplanar. Furthermore, coupler 136 constrains the reciprocating movement of the reciprocating bars 120, 122 in the vicinity of the coupler 136 such that bar 120 reciprocates in a direction that is parallel to the movement of bar 122 and vice versa in the vicinity of the adjacent ends of cutter bars 116, 118. Even further, coupler 136 constrains the movement of cutter bars 116, 118 in the region of coupler 136 such that they move relative to each other in directions that are parallel to each other.

The constrained coaxiality, co-planarity and parallel movement of the cutter bars and the reciprocating bars helps reduce the wear and friction between the overlapping reciprocating bars 120, 122 with respect to each other, and reduce the wear and friction between the reciprocating bars 120, 122 and their associated cutter bars 116, 118.

The coaxiality, co-planarity and parallel movement generally exists only in the region of coupler 136, since the cutter bars are supported on the forward ends of the float arms, and thus will flex and undulate along their lengths as the float arms pivot up and down at their forward ends to follow the contours of the terrain.

Coupler 136 comprises a first link 138 that is removably fixed to the end of cutter bar 116, a second link 140 that is removably fixed to the end of cutter bar 118, and a support member 142 that couples the first and second links together. Each of the first and second links 138, 140 comprises a first member 144 that is bolted to the cutter bars and extends to the rear of the cutter bars.

First member 144 is generally planar and has a plurality of apertures that are configured to receive fasteners such as bolts or rivets to fasten the first and second links 138, 140 to the cutter bars.

Each of first and second links 138, 140 also comprises a guide member 146 that is fixed to first member 144. Guide members 146 are configured to engage and be guided by support member 142 to follow a predefined path. Each guide member 146 defines a generally polygonal (preferably rectangular, as shown here) and vertically aligned aperture 148 that is configured to receive and be guided by the support member 142. Support member 142 comprises a guide member 150 that is vertically oriented and generally rectangular in cross section, and is configured to be received in apertures 148 of first and second links 138, 140.

It is guide member 150 that controls the relative positions and movement of the cutter bars 116, 118 by constraining them (and hence the cutter bars to which they are fixed and also the reciprocating bars 120, 122 that reciprocate with respect to the cutter bars) to slide along the length of guide member 150 in a direction that keeps them coplanar, coaxial and moving parallel to one another in a single linear direction, i.e. the direction defined by the longitudinal axis of guide member 150.

The apertures in guide members 146 that that extends in a lateral direction with respect to the combine and generally parallel to the axes of the reciprocating bars 116, 118 and the cutter bars 108, 110. The aperture is defined by generally planar internal faces, that abut similarly configured faces formed on guide member 150. The aperture has a generally constant cross section such that the inner surfaces of the aperture closely engage mating surfaces of guide member 150.

An antifriction layer 152 is disposed between the mating surfaces of the first and second links and the guide member 150 to reduce wear. The anti-friction layer is preferably made of a suitable anti-friction material, such as Nylon, PTFE, or polyethylene.

This arrangement reduces (and preferably prevents) relative rotation and relative translation of guide members 146 with respect to guide member 150 in all directions except in a direction generally parallel to the longitudinal axes of the cutter bars 116, 118 and in a direction generally parallel to the longitudinal axes of the reciprocating bars 120, 122 in the vicinity of the couplet 136. This arrangement minimizes the rotation of the two cutter bars 108, 110 and the two reciprocating bars 116, 118 with respect to each other about an axis generally parallel to the longitudinal axes of the cutter bars and the reciprocating bars.

Support member 142 also comprises a second member 154 that is fixed to guide member 150 and extends out behind guide member 150 and behind cutter bars 116, 118. Second member 154 comprises a pivotal coupling 158 that pivotally couples coupler 136 to member 156. Member 156 is coupled to and extends between two adjacent float arms 109 (shown schematically as 109' and 109" in FIG. 3) that are disposed on either side of coupler 136.

This arrangement permits the free ends of the cutter bars 116, 118 to pivot upward with respect to the two float arms disposed on either side of coupler 156 when the cutter bars 116, 118 in the region of the coupler 136. Thus coupler 136 provides the ends of the cutter bars 116, 118 with some vertical translation with respect to the adjacent float arms in the even of a sudden impact to the cutter bars in the area of coupler 136.

In the even of such an impact, the resultant movement due to pivoting of support member 142 and coupler 136 about the pivotal axis of pivotal coupling 158 is not pure vertical translation, however, but vertical translation with a small amount of rotation about pivotal coupling 158. The horizontal distance between reciprocating bars 120, 122 and pivotal coupling 158 is on the order of 10-15 inches, however, so for small vertical translations of cutter bars 116, 118 in the vicinity of coupler 136 under ground impacts—a vertical distance of 1-2 inches—the rotation of cutter bars 116, 118 and reciprocating bars 120, 122 about a laterally extending pivoting axis defined by pivotal coupling 158 is negligible.

The pivotal coupling 158 also serves to prevent fore-and-aft translation of the cutter bars with respect to the cutting platform. When the cutter bar hits an object such as a branch, rock or clod of dirt, this impact tends to force the reciprocating knife backward. Since the coupler 136 extends behind the cutter bar and is coupled to member 156, any impact against the front of the cutter bar is translated through the cutter bars, into the coupler 136 and back into member 156 which is coupled to the float arms 109 (109', 109") adjacent to coupler 136. The float arms, which are pivotally coupled at their rear ends to the frame 107 of the platform 106, transmit a resisting force back through member 156, coupler 136 and into cutter bars 116, 118, reducing or preventing the translation of the cutter bar ends in a fore-and-aft direction with respect to the cutting platform while permitting the cutter bar ends to pivot upward about pivotal coupling 158.

Having described the preferred embodiment, it will become apparent that various modifications can be made without departing from the scope of the invention as defined in the accompanying claims.

The invention claimed is:

1. A reciprocating knife cutter system for an agricultural cutting platform, comprising:
   a first reciprocating knife cutter further comprising a first cutter bar having a first end, and a first reciprocating bar, the first reciprocating bar having a first plurality of knife sections fixed thereto, a driven end and a free end;
   a second reciprocating knife cutter further comprising a second cutter bar with a second end adjacent the first end, and a second reciprocating bar, the second reciprocating bar having a second plurality of knife sections fixed thereto, a driven end and a free end, and further wherein the first reciprocating bar overlaps the second reciprocating bar; and
   a coupler configured to couple the first end of the first cutter bar to the second end of the second cutter bar, wherein the coupler is configured to hold the first and second ends coplanar in the vicinity of the coupler and to limit relative movement of the free ends to movement in a single linear direction, wherein the coupler is pivotally coupled to the cutting platform at a point behind the cutter bars to permit the first and second ends of the cutter bars to translate up and down with respect to the cutting platform while preventing the first and second ends from translating in a fore-and-aft direction with respect to the cutting platform.

2. The reciprocating knife cutter system of claim 1, wherein the coupler includes first and second members removably fixed to the first and second cutter bars, respectively, and a support member coupled to and between the first and second members to constrain their relative movement in a generally lateral direction.

3. The reciprocating knife cutter system of claim 2, wherein the first and second members define apertures which extend laterally and which are slidingly supported on the support member, wherein said support member extends laterally and is received in the apertures of the first and second members.

4. An agricultural cutting platform comprising:
   a) a main frame having at least one section;
   b) a plurality of float arms that are coupled at their rear ends to the mainframe and have forwardly extending front ends; and
   c) a reciprocating knife cutter system for an agricultural cutting platform, the system comprising:
      i) a first reciprocating knife cutter further comprising a first cutter bar with a first end and a first reciprocating bar, wherein the first cutter bar is coupled to the front ends of the plurality of arms on the left side of the cutting platform, and further wherein the first reciprocating bar has a driven end, a first free end, and a first plurality of knife sections fixed to the first reciprocating bar;

ii) a second reciprocating knife cutter further comprising a second cutter bar with a second end adjacent the first end and a second reciprocating bar, wherein the second cutter bar is coupled to the front ends of the plurality of arms on the right side of the cutting platform, and further wherein the first reciprocating bar has a driven end, a second free end adjacent the first free end, and a second plurality of knife sections fixed to the first reciprocating bar, wherein the first reciprocating bar overlaps the second reciprocating bar; and iii) a coupler configured to couple the free end of the first cutter bar to the free end of the second cutter bar, wherein the coupler is configured to hold the first and second ends of the cutter bars coplanar in the vicinity of the coupler and to limit relative movement of the first and second free ends to movement in a single linear direction, wherein the coupler is pivotally coupled to the cutting platform at a point behind the cutter bars to permit the first and second ends to translate up and down with respect to the cutting platform while preventing the first and second ends from translating in a fore-and-aft direction with respect to the cutting platform.

5. The reciprocating knife cutter system of claim 4, wherein the coupler includes first and second members removably fixed to the first and second cutter bars, respectively, and a support member coupled to and between the first and second members to constrain their relative movement in a lateral direction.

6. The reciprocating knife cutter system of claim 5, wherein the first and second members define apertures which extend laterally and which are slidingly supported on the support member, wherein said support member extends laterally and is received in the apertures of the first and second members.

* * * * *